March 31, 1931.   J. LEDWINKA   1,798,545
PRESSED METAL VEHICLE BODY
Filed March 5, 1925   6 Sheets-Sheet 1

INVENTOR.
JOSEPH LEDWINKA
BY
ATTORNEY.

March 31, 1931.　　J. LEDWINKA　　1,798,545
PRESSED METAL VEHICLE BODY
Filed March 5, 1925　　6 Sheets-Sheet 2
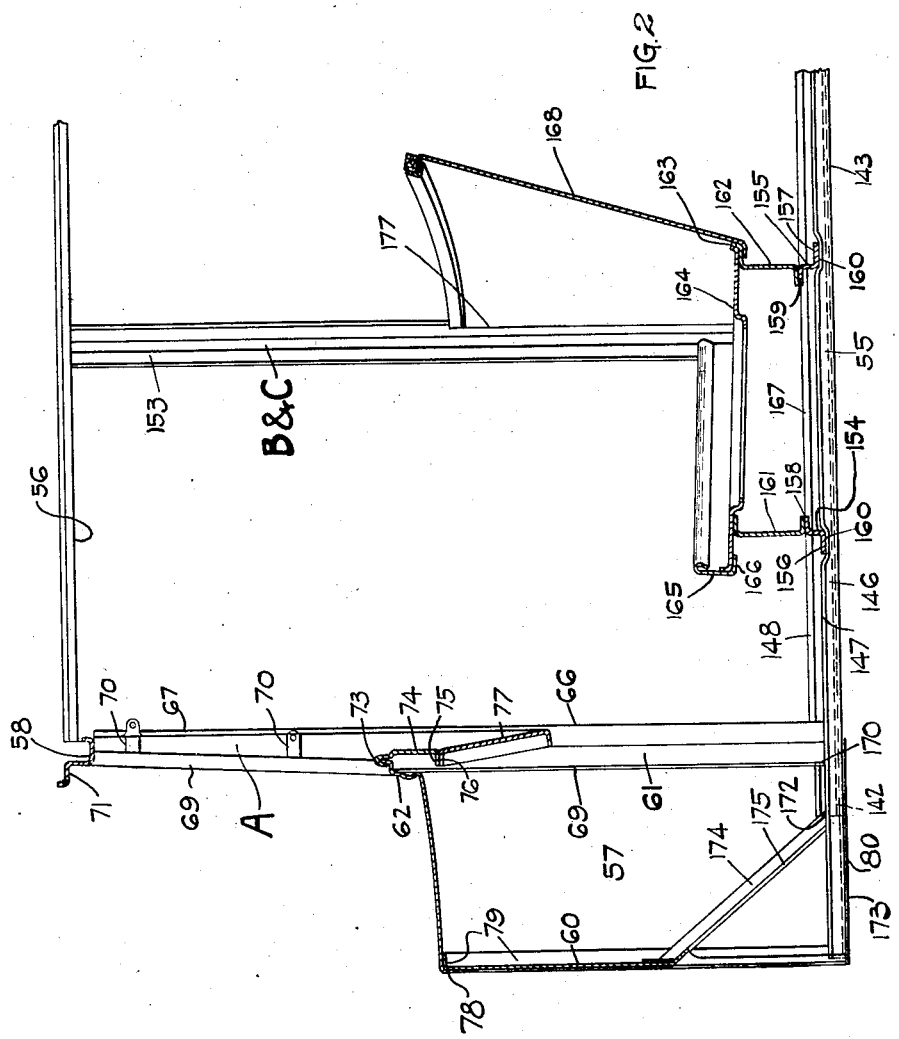
INVENTOR.
JOSEPH LEDWINKA
BY
ATTORNEY.

March 31, 1931.  J. LEDWINKA  1,798,545
PRESSED METAL VEHICLE BODY
Filed March 5, 1925   6 Sheets-Sheet 3
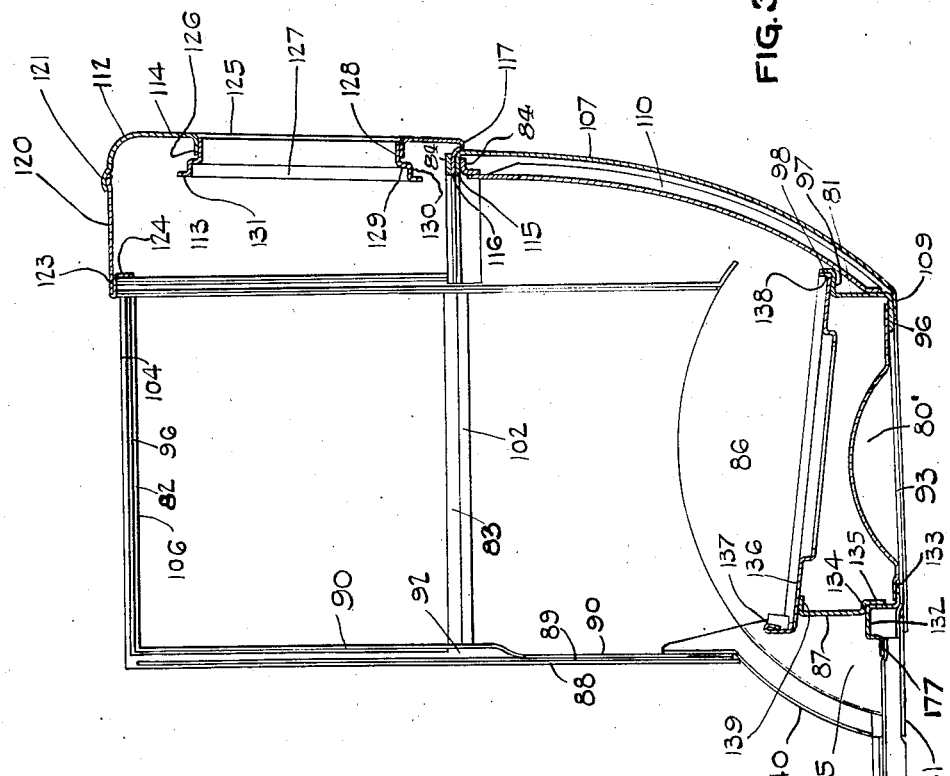
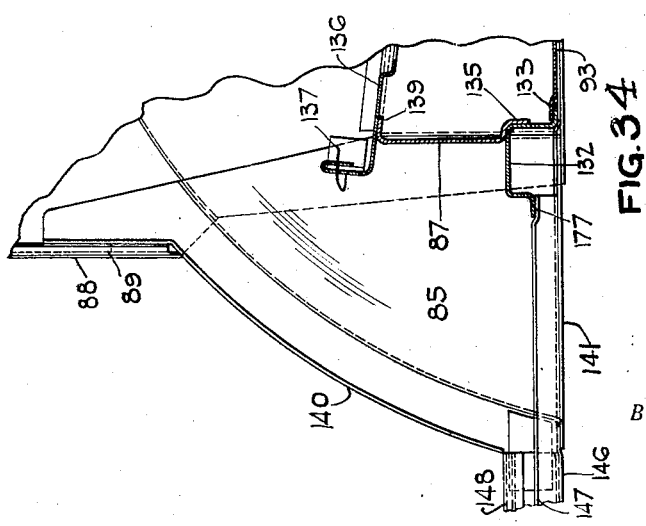
INVENTOR.
JOSEPH LEDWINKA
BY
ATTORNEY.

March 31, 1931.   J. LEDWINKA   1,798,545
PRESSED METAL VEHICLE BODY
Filed March 5, 1925   6 Sheets-Sheet 4
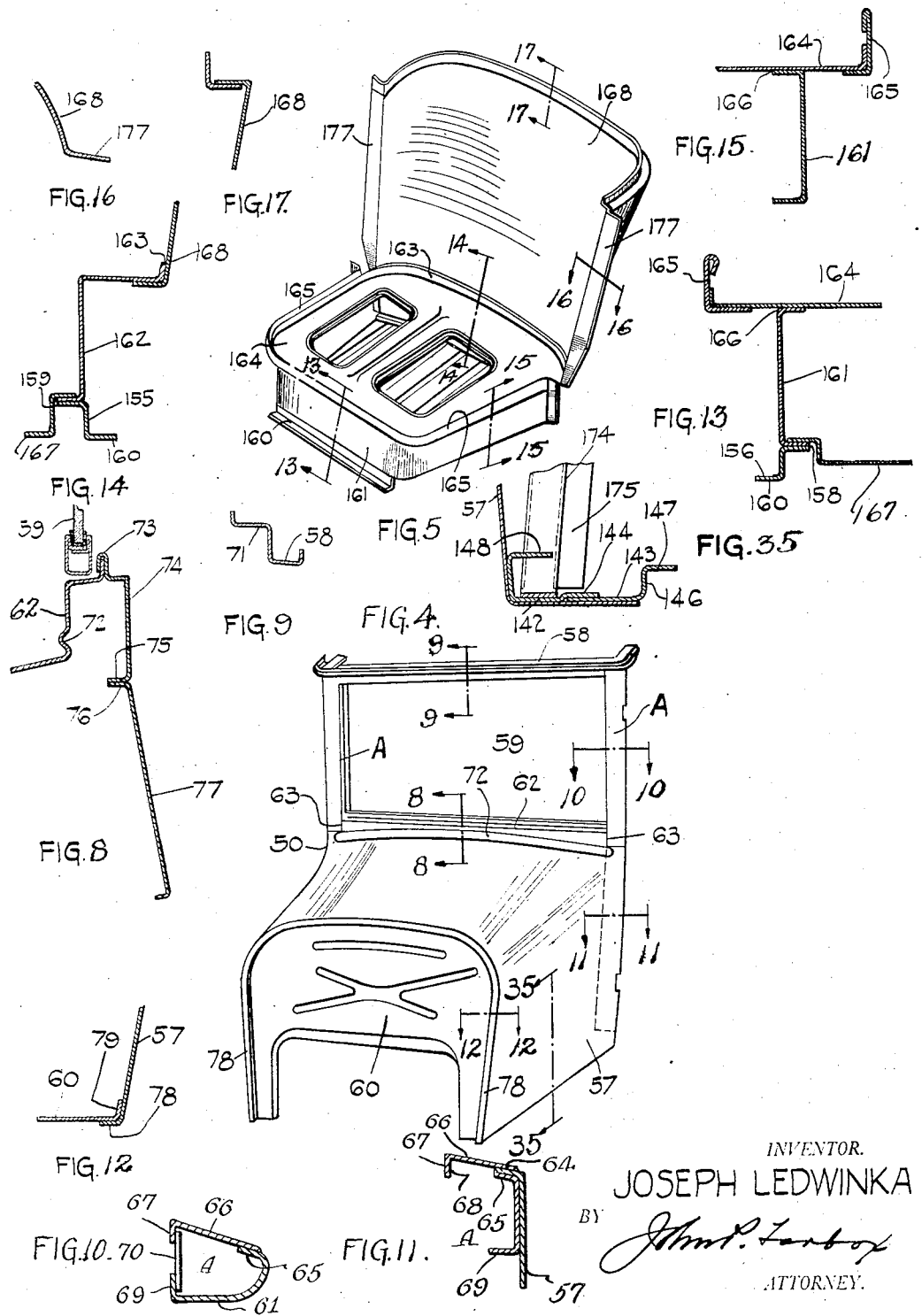
INVENTOR.
JOSEPH LEDWINKA
BY
ATTORNEY.

March 31, 1931. J. LEDWINKA 1,798,545
PRESSED METAL VEHICLE BODY
Filed March 5, 1925 6 Sheets-Sheet 5

INVENTOR.
JOSEPH LEDWINKA
BY
ATTORNEY.

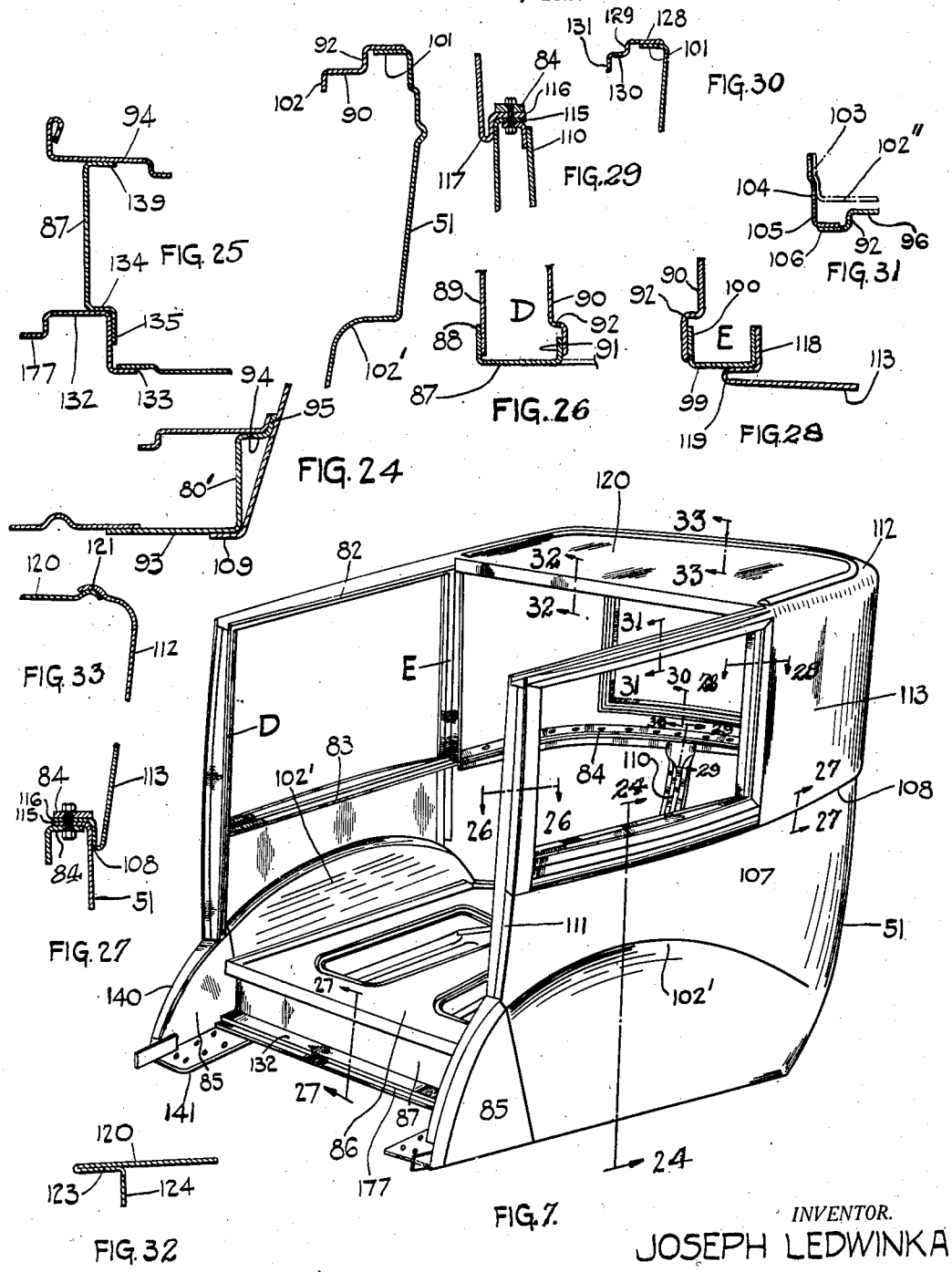

Patented Mar. 31, 1931

1,798,545

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED-METAL VEHICLE BODY

Application filed March 5, 1925. Serial No. 13,055.

My invention relates to pressed metal vehicle bodies of the type known as the closed body type. The invention has been perfected in connection with a sedan, and I show the sedan body in the accompanying drawings. At the outset, however, it should be understood that my invention is applicable to other closed body vehicles; such, for example, as the coupe and coach types. Indeed, there may be some features which can be used to advantage in open body types of vehicles.

Prior to my invention there had existed in pressed metal bodies of this type an entirely unnecessary amount of complexity, which led to high manufacturing costs, an unnecessarily high weight, and an inflexibility of adaptation to those fine and simple lines through the use of which those regular interior surfaces which insure maximum accommodation and comfort, and beauty of both interior and exterior appearance, must be secured.

In a closed body vehicle these features are in a large measure determined by the skeleton frame structure of the body, and in larger measure than is the case in connection with open bodies for the simple reason that there is a larger proportion of the exterior surfaces and lines of the skeleton frame appearing on the exterior surface of the completed body. This is particularly true of the sedan type, in which there are located two doors closely adjacent to each other on each side of the body, making four in all, and two large tonneau windows immediately in the rear thereof. The exterior surface of the skeleton framework immediately surrounding these openings is almost all constituted the outer surface of the body, taking the place of paneling per se. A principal object of my invention is the general improvement of this skeleton frame to the end of securing to the maximum possible degree the advantages above enumerated.

Subordinately, I have improved the structures of the posts themselves by special sections and composition of sections, and special disposition of the same between the tops and bottoms of the posts. These arrangements are such that they lend themselves more fully and economically to the joinder of the panels to them and their support of the panels so joined, whether or not all of the panels make the joinder at the same angle or with continuity of panel surface.

Another subordinate object is the construction of window frames in such manner that the simplicity of the skeleton frame is maintained, yet the window frame appears to be an outgrowth thereof, is subject to any special ornamentation which it may be desired to give such a frame, and admits the easy placement of the window glass. I have sought to effect a strengthening of the skeleton frame or of the panel by these window frames.

Still further, I aim to form the body side sill of this skeleton frame so that, while conforming to the above requirements, it lends itself effectively to unit construction and the making of simple and strong joints at its opposite ends.

A second principal object of my invention has been the adaptation of a frame having the characteristics specified to the more effective support of the seating and other accommodating structures within the body. In this connection, both the front and rear seating structures have had my attention from two points of view:

First, I have endeavored to arrange a skeleton frame foundation for the mounting of the seats which, while providing ample strength and ruggedness, admitted the use of seat supporting structures of regular, rather than irregular, lines, and which might be easily mounted and welded or otherwise secured in place.

Secondly, I have endeavored in connection with this object to devise seat supporting structures of this regular line and adaptation which could not only be easily secured in place, but could be secured in place from the interior, obviating outside joints and all ill-appearing irregularities, which seat supports at the same time afford a definite alignment for the seat bottoms and a maximum facility for association with or attachment to the seat backs.

It has, too, been a related object in connection with these seat structures to utilize so far as possible the skeleton frame itself as a seat-supporting means. These several aims in connection with the reorganization of the seat structure have led to the evolution of an entirely new section for the seat-supporting stampings and the cross braces.

There are yet other objects of my invention, which will appear from the detailed description which follows:

Of the drawings—

Fig. 2 is a central sectional elevation of the body from the front to the front seat structure.

Fig. 3 is a similar section of the remainder of the body, which comprises the tonneau section.

Fig. 4 is a perspective view of the front or cowl unit.

Fig. 5 is a perspective view of the front seat structure.

Fig. 7 is a perspective view of the rear or tonneau unit.

Figs. 8 to 12 are detailed cross-sections of portions of the cowl unit respectively taken on the lines designated 8—8 to 12—12 respectively, and looking in the direction of the arrows appearing in Fig. 4.

Figs. 13 to 17 inclusive are respectively detailed sections on lines 13—13 to 17—17 of Fig. 5 and looking in the direction of the arrows.

Figure 6:
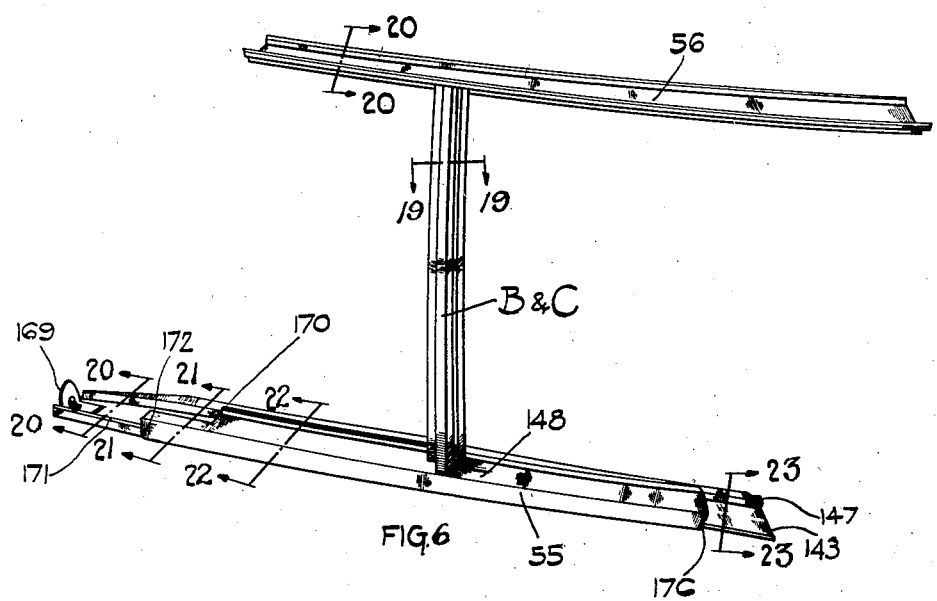
Fig. 6 is a perspective view of the side frame unit comprising body side sill, B and C posts, and top rail.

Figs. 18 to 23 inclusive are respectively detailed sections of parts associated with the side frame unit of Fig. 6, taken on the lines designated by corresponding numbers in Fig. 6 and in the direction of the arrows.

Figs. 24 to 33 inclusive are respectively detailed sections on lines of corresponding numbers appended to Fig. 7, the presentation of the tonneau section, and likewise in the direction of the arrows.

Fig. 34 is an enlarged sectional view through the center line of the body showing post D bracket in side elevation, and Fig. 35 is a detail sectional view taken on the line 37—37 of Fig. 6, looking in the direction of the arrows.

Figure 1:
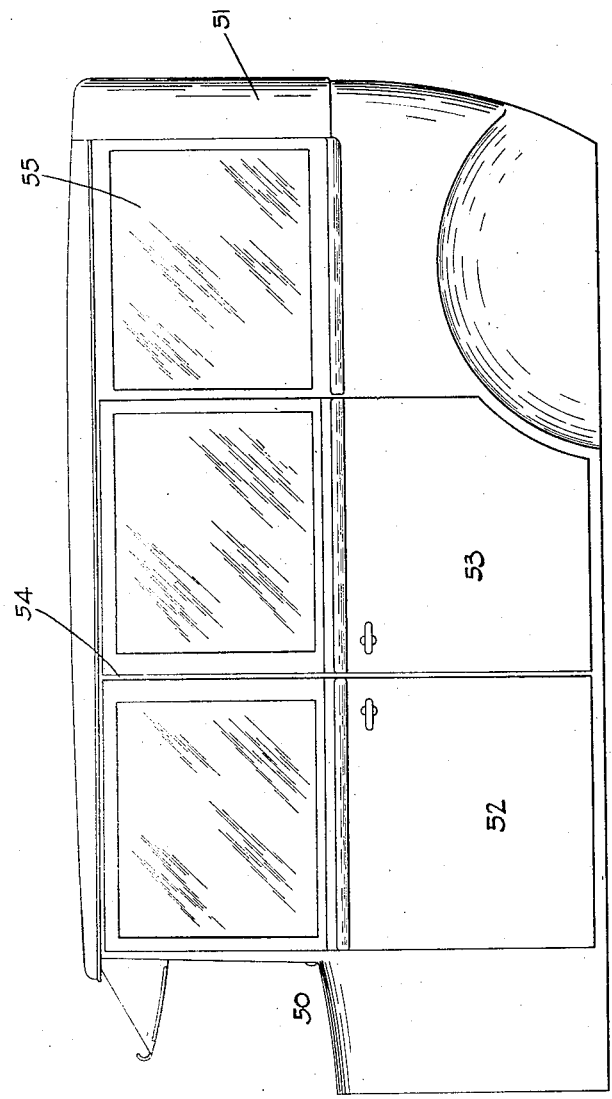
Fig. 1 is a side elevation of the sedan body.

Referring to Fig. 1, in which the completely assembled body is delineated, the cowl and tonneau sections and the intermediate sections will be readily identified. The cowl section is designated generally 50 and the tonneau section generally 51. Intermediate these sections on each side of the body are two doors, the front door 52, the rear door 53, and these doors close toward each other upon an intermediate B and C post 54. The tonneau unit contains tonneau side windows 55.

These doors and windows make up substantially the entire area of the sides of the car between the cowl section 50 and the tonneau section 51, they lie closely adjacent to each other, and are separated mainly by the body posts themselves. The doors extend substantially from top to bottom of the body; i. e., from top rail to body side sill. The body posts, body side sills and top rail constitute the principal portion of the skeleton frame of the body.

This completed body is, for reasons of convenient and cheap manufacture, and ease and economy in space in handling and shipping, manufactured in sections or units. In this particular embodiment it is divided for these purposes into the cowl unit 50 (shown in Fig. 4) the tonneau unit 51 (shown in Fig. 7) two side frame units, one of which is shown in Fig. 6, detached cross braces (not separately shown) and the front seat unit, shown in Fig. 5. The cowl unit embodies the cowl portion of the skeleton frame and the front or A posts of that frame, and the front top rail, with appurtenant parts. The tonneau unit comprises the tonneau portion of the skeleton frame, including the rear or D posts, the tonneau side and rear sills, the outer panel, as in the case of the cowl unit, and, in this case also, the rear seat structure. The side frame units comprise the side portions of the skeleton frame intermediate the A and D posts of the body—i. e., the body side sill 55, the B and C posts, and the top rail 56. The front seat unit comprises the seat-supporting structure above the skeleton frame (see Figs. 2 and 5) and the seat back panel.

The A-posts of the cowl unit, which we see in Fig. 4 and Figs. 8 to 12, are designated by that letter. Their bottom portions are interconnected by the cowl panel 57 and their tops by the frame top rail 58. Between them and the rear upper edge of the cowl panel and the top rail 58 is the windshield opening 59. At the fore end of the cowl is the shroud pan 60.

The bodies of the A posts 61 are formed of a vertically extending member of channel cross section as shown in Figs. 10 and 11. The bottom of the channel is laterally disposed at the bottom of the post and substantially in the longitudinal plane of the cowl panel 57 which is attached thereto. The top of the post shown in Fig. 10 is in effect twisted so as to place a portion of the bottom of the channel substantially at right angles to its lower position. The transversely extending windshield panel 62 is connected at its ends along lines 63 with this transversely extending bottom of the twisted body section of the post. The same post, therefore, is adapted for efficient joinder to and support of both longitudinally and transversely extending panels. The edges of the cowl panel are on their sides provided with an inwardly extending flange 64 overlapping the rear side wall 65 of the body 61 of the post (Fig. 11). Welded to this flange 64 and through it to the side wall 65 is a branch 66 of a forwardly and outwardly presenting angle 67 constituting the door mounting rail of the post. The post is thus of compound section comprised of the channel 61 and the angle 67, welded to one side thereof and facing the interior of the channel. At its upper end the inner branch 68 of this angle is connected to the other side wall 69 of the channel by means of tie straps 70 welded thereto and crossing the intervening space. It will be observed that while the bottom of the channel 61 is flat in its lower portion throughout its width, in its upper portion it is flat on its inner margin and curved on its outer margin, whereby a curved fore-body is provided for the post from the cowl panel 57 upwardly to the top rail, giving an extremely neat and highly ornamental appearance.

The front top rail 58 is of the section shown in Fig. 9, a channel section facing upwardly and having an upward offset 71 in the outer margin of its body, making it of Z-form at this point.

The windshield belt panel 62 (Figs. 4 and 8) is formed in one piece with the cowl panel 57, constituting it an upward extension therefrom. A forwardly protruding bead 72 is used to mark the line of juncture with the top of the cowl panel. Its top edge is turned rearwardly and then upwardly to form one element of the joint 73 between the windshield belt panel and the interior finishing rail 74 whereby to form a stop and weather strip for the lower edge of the windshield. The front panel 62 is connected with the twisted bottom wall of the channel section 61 of the post, as appears in Fig. 10, while the interior finishing rail or instrument board 74 is connected with the rear wall of the post formed by the angle at 67, also as shown in Fig. 10. Finish rail 74 is flanged forwardly and upwardly and received within the bead 73, which is crimped over it. Its lower edge is provided with a forwardly extending flange 75, to which is welded a similar flange 76, of the instrument board 77. The ends of this board are in turn suitably formed and likewise connected to the flanges 68 of the A post.

Forwardly, the cowl 57 has its front edge provided with an inturned flange 78, in the angle of which with the main body the shroud pan 60 is nested, being provided with a rearwardly turned flange 79 for this purpose. Welding is from the flange 78 to the body of shroud pan 60. The lower edges of the panel 57 are provided with inturned flanges 80, as appears in Figs. 2 and 35 as usual.

The tonneau unit 51 (Figs. 3, 7 and 24 to 33) in addition to the D-post embodies the tonneau side sills 80′, the tonneau rear sill 81 (Fig. 3) the E post, the rear quarter window header 82, the rear quarter window belt panel 83, the cross brace rail 84, and the post D brackets 85, by means of which these other members of the skeleton frame are to be connected to the remainder of the body. Within this tonneau skeleton frame is mounted the tonneau seat structure designated generally 86. Without it is mounted the tonneau paneling.

The D posts are of the section shown particularly in Fig. 26. Like the A posts, they comprise a main body of channel section 87 facing inwardly. The mounting face of the post—i. e., the face which receives the door hinges, checks and like fixtures, is comprised of the forward side wall 88 and a vertically extending strip 89 welded to the inner face thereof. The window face of the post is formed by a vertically extending member 90 of the Z-cross section welded to the outer face of the rear wall 91 of the channel and having the main body 92 of the Z-section extending inwardly of the post. Thus, both the arms of the Z-section are parallel to the side wall 91 of channel 87. At their bottoms the D-posts are founded upon the post-D brackets 85.

Through the post D brackets the D-posts are connected with the bottom of the tonneau side sills 80′ (see Figs. 7 and 24). These side sills 80′ are of Z-cross section, having their lower arms 93 substantially in the plane of the bottom of the body, their main bodies substantially vertically upstanding, and their arms 94 extending outwardly. At their outer edge the upper arms 94 are provided with an upturned lip or flange 95.

The rear tonneau sills 81 (Fig. 3) are of similar section, having main body and arms similarly disposed, the lower arm 96 of the Z extending forwardly and the upper arm 97 extending rearwardly, and being provided with an upwardly extended flange 98.

Intermediate the D-posts and the rear of the tonneau are the E-posts, designated by that letter in Fig. 7 and having the section shown in Fig. 28. There it will appear that, as in the case of the A and the D-posts, the E-post has its main body formed of a channel section 99. Its window face is completed by a vertically extending strip of the Z cross section secured to the outer face of the window side wall 100, and by reason of its substantial identity with the strip 90—92 is similarly designated. In fact, this window facing may be a continuous strip bent to rectangular form around the entire opening and having the outer arm of the Z-section secured to the outer face of the side walls of the window frame members. The bottom rail or sill of the window is of the form shown in the upper portion of Fig. 24, and is numbered similarly 90—92. However, in this case the facing strip 90—92 is secured to an inturned flange 101 of the tonneau paneling 51, and on its inner arm is provided with a downturned lip or flange 102, jointly for the purpose of finishing the structure and providing a securing means or foundation for the support of upholstery at this point. This window sill structure, designated generally 83, extends from the D-post to the E-post. The E-post has its bottom connected to and secured to the upper arch of the wheel housing structure 102', while its top reaches and is welded to the top rail 82. The top rail 82 is of the section shown in Fig. 31. It has a member 102'' of angle cross section facing upwardly and inwardly. The upper branch of the angle is offset slightly outwardly as at 103. Welded thereto is a branch 104 of a depending angle member 105, the branches of which are parallel to the branches of angle 102'' but the lower branch 106 of which is fixed slightly below the corresponding branch of the angle member 102. The Z-section member 90—92 comprising the upper portion of the window facing is welded by its outer and lower arm to the underface of the lower branch 106 of the supplementary angle 105.

The tonneau paneling 51 is formed in two sections, a lower section 107 extending from the tonneau side sills 80' upwardly to the waist-line of the body designated 108, and concaved to form the wheel housing section 102' previously mentioned in connection with the foundation of the E-post. This wheel housing section 102' is merely an inward depression of the body panel 107, as usual formed for accommodating that portion of the wheel structure which lies in this space. On its underside panel 107 is provided with a flange 109 underlying and is welded to the bottom arm 93 of the Z-sectioned tonneau sill 80' (Fig. 24). It extends upwardly in contact with and braced by the upturned flange 95 of the upper arm 94 of this section. It extends all the way around the tonneau in one piece. In the rear (Fig. 3) it is also welded to the lower arm of the Z-sectioned tonneau rear sill 81 by underlapping flange 109, but here its main body is spaced away from the upper arm 97 of this rear sill to make room for the rear center brace 110 which passes between it and the sill. At its front edges in the lower portion it is secured directly to the post-D brackets 85, while in its upper portion it is flanged inwardly as at 111, and this flange is welded to the mounting face of the D-post.

The upper section of the tonneau paneling is designated generally 112 and comprises quarter portions 113 and rear portions 114, extending as it does from the E-post around the rear of the upper portion of the tonneau. It is founded upon and secured to the lower panel by the overlapped inturned flanges 115 and 116 on the lower and upper panels respectively. The upper panel immediately adjacent the flange 116 is provided with a depending and greatly flattened bead 117, which not only overlaps the joint between the flanges 115 and 116, but lies with its main body flatly against the outer surface of the lower section 107 immediately adjacent its top flange 115. There it not only effectually hides the joint, but also, by reason of its flat and firm overlap, considerably strengthens this joint and by reason of its beaded nature provides a curved corner juncture line which may be effectually utilized to derive an attractive longitudinal contour line. In the longitudinally vertical plane the tonneau rear brace 110 has its lower end welded to the main web 81 of the Z-sectioned rear sill and its upper end welded or otherwise secured to the inturned flanges 115 and 116. This brace, in addition to stiffening the tonneau panels, is utilized in a manner not necessarily shown here, to form a reinforcing support for the spare tire carrier which may be attached to it through the body of the panel 107.

These flanges 115 and 116 extend from E-post to E-post. The waist-line reinforcing members 84—84 (see Fig. 3) overlie and underlie respectively the upper flange 116 and the lower flange 115 and augment the stiffening and shape-holding function of these flanges. Members 84 are welded at their ends to the E-posts. It will be observed that this reinforcing structure 84 is in longitudinal continuation of the window sill structures 83.

At their front edges, the quarter panel portions 113 of this upper panel 112 are provided with inturned flanges 118 and secured to the E-posts in the manner shown in Fig. 28. Adjacent to flanges 118 they are provided with joint hiding and strengthening ornamental beads 119, similar in all substantial respects to the beads 117 at the lower edge of this upper panel. But in this case the flattened beads overlap partway the exposed outer faces of the channel sections 99 which constitute the main body of the post.

Extending from top rail to top rail of the tonneau, with its forward edge substantially in the plane of the E-posts, is a top panel reinforcing and rear rail forming member 120, Figs. 3 and 7. This member is in the form of a plate stamped of sheet metal, having a perimeter conforming to the perimeter of the upper edge of the tonneau of the panel 112. Both perimeters are upwardly beaded as indicated at 121 in Figs. 3 and 33, and welded together along the line of the bead to form through the duplex beaded structure a continuation of the top rails 82, from which point the beaded structure 121 emanates. The paneling 112 is arched neatly over from the vertical to the horizontal position around its entire upper edge, and this arch through suitable variations is adapted excellently for moulding the contour lines of the body at this point into the contour lines of the top of the structure. These tops are usually formed separately and superimposed upon the pressed metal structure described. Moreover, the outwardly beaded structure 121 marks a neat line of juncture between the top and the quarter panel. The fore-edge of the brace 120 is reversely bent as at 123, and the reversely bent portion 123 is provided with a downwardly extending flange 124, all of which are welded at the ends to extensions of the top rails 82 and function to stiffen and strengthen the cross bracing of the structure.

In its rear the upper panel 112 is provided with window opening 125, provided with an inturned flange 126. Welded to this is the interiorly disposed rear window facing 127, which is of inwardly flaring form. It is of compound Z-cross section, having its outermost arm 128 welded to the exterior face of the flange 126. The main body 129 of the Z-section lies substantially in the vertical plane, and this main body and the inner arm 130 constitute the angle which receives the glass. The inner arm 130 is provided with the out-turned flange 131 which constitutes the final flare of the frame and lies substantially in the vertical plane, being adapted to receive and have secured to it both the glass-retaining rim (not shown) and the upholstery.

The fore edge of the skeleton frame designated generally by numerals 80' to 85 is cross braced by a member 132 of channel section presenting downwardly. Its outer side walls are flanged outwardly, and the rear side wall is of greater height than the front side wall. Its flange 133 is rested upon and welded to the horizontal arm 93 of the tonneau side sill 80' at each extremity (note particularly Fig. 3).

Seat structure 86 is mounted within the tonneau frame. It comprises a front seat support 87 of channel section facing inwardly of the seat structure, having its lower side wall 134 seated on the base wall of the channel cross brace 132. The wall 134, however, is also downwardly flanged to overlap the rear side wall of cross brace 132. Thereby the two parts 87 and 132 may be welded together with facility, the electrodes being applied to the flange 135 and the rear wall of member 132. A seat bottom stamping 136 of any desired construction is upwardly flanged as at 137 on its front and 138 on its rear, and is of a width somewhat greater than the distance between seat support 87 and the flange 98 on the rear sill 81. It is rested upon the upper arm 97 of sill 81, and upon the upper flange 139 of the member 87. The sill arm 97 and seat bottom 136 respectively are welded together and flange 139 and the body 136 of the seat bottom are welded together. Its outer edges are also upturned (see Fig. 24) and nested within the angle between the upper arm 94 and the upturned flange 95 therefrom of the tonneau side sill 80'. So the Z-sectioned tonneau side and end sills not only support the seat bottom on the upper arms thereof, but accurately position and align the same through the upturned flanges on the upper arms.

The post-D brackets 85, comprise a main body which is of a form in continuation of the wheel housing 102 of the side paneling connected with it, being concave outwardly and therefore convex inwardly. The fore edge of the stamping is, too, a continuation of the arc-shaped upper edge of the housing. The fore edge is extended forwardly and then inwardly to form, with the adjoining portions of the main body 85, a fore portion of channel section. This extends from the bottom of the bracket upwardly and rearwardly, and is appropriately joined to the D-posts as usual. So it forms a fore-extension of the D-posts. This portion is designated 140. The lower edges of the brackets are provided with extensive inturned flanges 141. The fore ends of the tonneau side sills have the main bodies and lower arms 93 of the Z-section extended and nested neatly within the angle between the main bodies 85 and the inturned flanges 141 of the post-D brackets, and are welded and riveted thereto.

The side frame units of Fig. 8 embody no exterior paneling. They are comprised of skeleton frame members only. The sill 55 in the main is of the section shown in Fig. 22, comprising two angle stampings, 142—143, having lower branches welded together at 144 and upper branches 145 and 146 of different length. The member 142 is the outer one and its upper branch 145 is of greater height than branch 146 of the inner member. Branch 146 is provided with a flange 147 extending inwardly and adapted to support the floor boards. Branch 145 is provided with a more extended flange 148 in a plane above the plane of the flange 147, which supports the floor boards, and in this case constituting the threshold of the doors of the car and lying substantially in or slightly above the plane of the upper surface of the floor boards. Its inner edge is upwardly beaded at 149 to provide a stop for the lower edge of the door, to effectively mark the juncture of the threshold with the floor boards, to constitute an ornamental contour, and also to provide a substantially vertical face 150 against which the outer ends of the floor boards may be abutted and accurately positioned.

Figure 21:
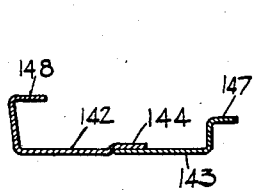
Figure 22:
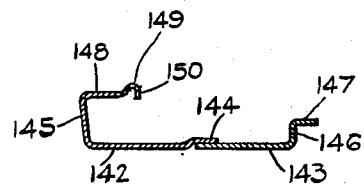
Figure 23:
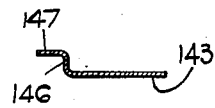

The B and C post, designated B and C, is of a section shown in Fig. 21, its main body is channel member 151, having its side walls rabbeted as at 152, in accordance with the usual practice. Within the angles of the rabbets, and between the outermost side walls, is nested a reinforcing channel member 153, which is welded thereto through its side walls.

Figure 18:
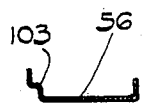
Figure 19:
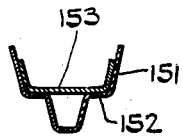
Figure 20:
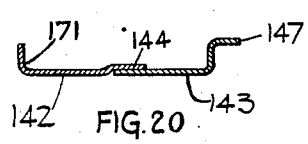

The top rail 56 is of a section shown in Fig. 18, a channel section presenting upwardly and substantially identical with the top rail 82 of the tonneau window frames, the outer side wall being provided with an outward offset 103, as in the former case. These three elements which comprise the unit are welded and otherwise secured together, the sill to the lower end of the post and the top rail to the upper end. In the one case the securing is by abutting the end of the post upon the extensive inturned flange 148 of the body side sill and seam-welding and otherwise securing it thereto; in the other case, by similarly abutting and securing the top end of the post to the underside of the bottom wall of the channel of the top rail 56.

The front seat unit shown in Figs. 2 and 5 comprises skeleton frame cross braces 154 and 155 of Z-cross section, having lower arms 156 and 157 respectively adapted to be secured to body side sills 55 and upper arms 158 and 159 extending inwardly of the seat structure. These lower arms are adapted to be rested upon and secured to the inturned floor board supporting flanges 147 of the body side sills, and these flanges 147 at the points of securement are depressed as at 160 to an extent sufficient to bring the upper face of flanges 156 and 157 on a level with the upper face of flange 147, whereby flanges 156 and 157 constitute effective cross supports for the floor boards. Moreover, their main bodies are of such height that their upper arms 158 and 159 have their upper surfaces positioned in the plane of the threshold flange 148 of the body side sills, whereby to constitute the upper arms 158 and 159 and the threshold flanges 148 a continuing foundation for the front seat support. The front seat support 161 is of channel cross section presenting inwardly of the seat structure, and has its lower side wall founded upon and welded to the inwardly extending arm 158 of the front cross brace 156 and the threshold 148. As shown in Fig. 5 the free ends of the side walls of the seat support 161 are laterally flanged for joinder with the front wall of the channelled body posts B—C. The rear seat support 162 is of Z-cross section, having its lower arm founded upon and welded to the upper arm 159 of the rear cross brace 155 and its upper arm projecting rearwardly. The upper arm is provided with an upwardly extending flange or lip 163, the front seat bottom pan 164 being seated jointly upon the upper arm of the Z-section 162 and the upper wall of channel 161. Both its front and its rear edges are upturned and it is positioned in place by the bearing of the upturned rear edge against the upturned flange 163 of the rear support 162, and welded in place. Its front edge, however, instead of having a cushion retaining flange formed in one piece, has a cushion retaining flange formed by the upstanding branch 165 of an angle section, the lower branch of which 166 is welded to the underside of the seat bottom 164. Its upper edge is inturned and downturned to form a finishing bead. Within the body of the seat structure the flanged joints of the arms 158—159 of cross braces 156 and 157 support the seat pan 167, which is rested upon and welded to their upper surfaces. The seat back panel 168 of curvilinear transverse section has its lower edge flanged forwardly and is welded in underlapping relation to the upper arm of the Z-sectioned rear seat support 162.

In making the A-post joint of the body side frame unit of Fig. 6 with the cowl unit of Fig. 4 I have, it will be observed, left the A-post short at the bottom and raised from the bottom edge of the cowl panel. I form the fore end of the sills 55 as shown in Fig. 6 and in detail in Figs. 20 and 21. Here it will be seen that the end of the sill is made long enough to reach all the way from the A-post to the shroud 60 of the cowl unit (see also Fig. 2) and yet leave sufficient length to give the front door full width. At the end of this extension is welded an angle 169 securing the bottom of the sill to the inner face of the shroud pan 60. The line of juncture of the A-post with the sill is designated 170. The outer wall 145 is cut back from the ends of the sill part of the way to this line, but not all of the way, and not entirely removed, a small upturned flange 171 being allowed to remain, as clearly appears in Fig. 20. Between the juncture line 170 and the end 172 of this cutback, the threshold flange portion 148 is cut away for a portion of its length, but not entirely. When the side frame unit is slipped into place, this extension of the end of the sill is slipped under the end of the A-post and into the angle between the body of the panel and the underturned flange, the upstanding end of the angle 169 is welded to the shroud pan, the underflange 173 of the cowl panel is welded to the bottom of the sill extension, and the lower end of the A-post is seated upon the threshold portion 148 of the sill just in rear of the line 170 and puddle-welded thereto. The toeboard support 174 (Fig. 2) has its upper end welded to the shroud pan and its lower end founded upon and welded to the side sill between lines 172 and 170, as indicated in Figs. 2 and 6. Its body passes through the cutback portion of threshold margin 148 and is welded to the bottom of the sill channel.

The upper end of top rail 56 is joined to the front top rail 58 at the top of A-post by corner brackets and welding in an approved manner, not herein shown.

With both side frame units in position, the tonneau unit of Fig. 3 is pushed into place.

The rear ends of the side sills 55 are cut back to lines 176, marking the fore-edge of the post-D brackets 85, the sill at this end being provided with an extension of the bottom of the channel and the floorboard supporting flanges of sufficient length to overlie and make a good joint with the bottom flange 141 of the post-D bracket. The sill side wall 145 and the threshold flange 148 are entirely cut away. The joint with the post-D bracket is made by welding or riveting or both, and, as shown in Figs. 3 and 34 by overlapping both the inturned flange 141 of the post-D bracket and the corresponding flange 93 of the tonneau side sill. The floorboard flange 147 of the sill extends under the fore-flange 177 of cross brace 132 and is welded thereto to support the fore-edge of this cross brace, flange 147 being slightly depressed in the area of the overlap in order to bring the fore-flange 177 to its general surface level and give an even floor. At the line 176, the channel section 140 of the post-D bracket is puddle-welded along the entire line of meeting. Moreover, the channel 140 is cut away in its lower portion and a flat reinforcing strip welded to its bottom wall and to the outer wall 145 of the sill, to reinforce the vertical juncture of the parts and to provide a neater joint.

The rear end of the top rail 56 is extended considerably beyond the extended end of the rear of the bottom sill 55, sufficiently to extend all the way to the top of the E-post of the structure. Slipped into place overlying the tops of both the D and the E-posts, the top of the D-post is provided with reinforcing and puddle-welded in the corners to the bottom of the channel of the top rail, the E-post is similarly joined thereto and, finally, the parts are bracket-connected and welded to the quarter panels 112 and the cross braces 120.

The front seat unit is set into place before the post-D joints just described are made. The unit embodies the cross braces 154 and 155. Positioned in place, it is most simply secured there by welding the ends of the bottom arms 156 and 157 of the cross braces into the sill depressions 160 formed to receive them. The bottom wall of the channel section of seat support 161 is welded at its ends to the threshold portion 148 of the sill which it overlies. The ends of this support 161 are respectively flanged outwardly in line with the fore-walls of the channel section B and C posts, and these flanges are riveted or welded to the walls of the posts. Moreover, the ends of the front seat back panel 168 are laterally flanges in the transverse plane of the rear walls of the B and C posts and the flanges welded to these rear walls interiorly thereof, as clearly appears in Fig. 2, the flanges being designated 177. The rear seat structure 86 is already in place, having been assembled as a part of the rear or tonneau unit.

Clearly, the joints possess the advantages I have sought to attain,—simplicity, ruggedness, and easy and economical assembly by unskilled labor. Clearly, also, the unit construction which I have devised lends itself admirably to a simple jig assembly, to general accessibility of parts for the joinder by electric spot welding, provides that openness of construction which aids jig welding in which parts of the jig are constituted electrodes of the welding machine itself, lends itself to ready and perfect alignment, and, in general, to those manufacturing economies in jig placement and welding which are essential requirements for low cost production. Yet, withal, the principal aims of my invention have not been impaired through these adaptations. They are attained in a remarkable degree.

What I claim is:

1. A pressed metal body post of channel cross section having a portion of its body twisted to bring a side wall of the twisted portion into substantially parallel relation with the bottom wall of the untwisted portion.

2. A pressed metal body construction comprising a pressed metal rear and quarter panels extending to the top rail of the body, and cross bracing in the form of a brace extending from quarter panel to quarter panel across the body, and having a perimetral connection with the tops of the panels.

3. A pressed metal body construction comprising quarter and rear tonneau panels extending substantially to the top rail line of the body and cross bracing for the said panels in the form of a horizontal extension forwardly from the top edges thereof and to a line interconnecting the forward top corners of the quarter panels.

4. A front seat pressed metal seat supporting structure comprising body frame posts of channel cross section presenting inwardly, and a front and side supporting stamping in one piece having end flanges connected respectively to the front side walls of said posts, and a front seat back panel also of U-shape form having end flanges connected to the rear side walls of said posts.

5. A pressed metal vehicle body frame comprising body side sills of stampings having threshold walls and floor board supporting walls below the level of said threshold walls, and body frame cross braces founded on said floor board supporting walls and flush with said threshold walls, together with a body seat supporting member jointly seated upon and secured to said threshold walls and said body cross braces.

6. In a pressed metal automobile body, a side frame sub-assembly unit including a vertically extending door post and a longitudinally extending side sill integrally joined together, said side sill being provided with a frontal lip in combination with a cowl sub-assembly unit including an inclined toe board support and a vertically extending door post, the bottom of said post being spaced above the bottom plane of the cowl unit whereby the forward end of said side frame unit may be positioned therebelow to effect a final assembly unit joint between said frontal lip and said inclined toe board support.

7. In a pressed metal automobile body, a side frame sub-assembly unit including as one element thereof a longitudinally extending side sill, said side sill being provided with an inwardly extending top flange depressed at its rearmost end, in combination with a tonneau sub-assembly unit including tonneau side sills interconnected by a cross brace of substantially inverted channel cross section, said cross brace being provided with a forwardly extending flange, one end of which is adapted to be seated in the depression in the side sill and secured thereto whereby to effect a final assembly unit joint.

8. In a vehicle body construction, longitudinally extending pressed metal side sills having floor supporting ledges provided with downwardly offset portions, and a pressed metal cross member connecting said sills having a floor supporting ledge, the ends of which are seated and secured in the downwardly offset portions of the sills, whereby the floor supporting ledges of the sills and cross member may be in substantially the same plane.

9. A pressed metal vehicle body comprising a tonneau side sill of Z-cross section having inner and outer arms, and which section terminates inwardly in the inner arm of the Z, a tonneau side panel secured to the Z-section and extending diagonally from the bottom of the main body thereof to the outer extremity of the outer arm thereof, and a seat bottom pan secured to the inner arm in overlapping relation thereto.

In testimony whereof I hereunto affix my signature.

JOSEPH LEDWINKA.